Oct. 24, 1961 W. D. BROWN ET AL 3,005,213
RESILIENT SEAT CONSTRUCTION AND METHOD
Filed Oct. 13, 1958 2 Sheets-Sheet 1

INVENTORS.
Warren D. Brown,
Samuel M. Terry.
BY
Harness and Harris
ATTORNEYS.

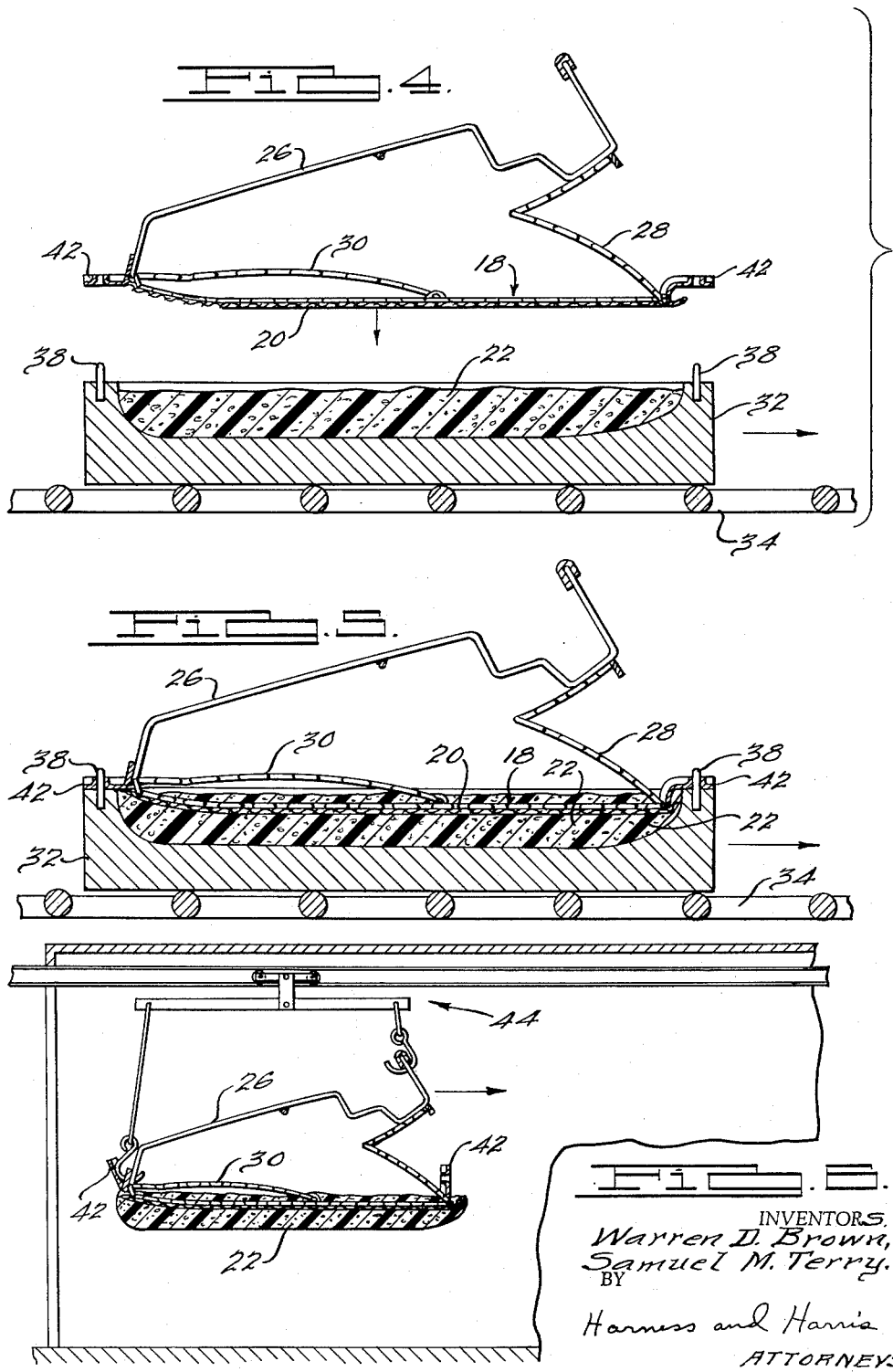

United States Patent Office 3,005,213
Patented Oct. 24, 1961

3,005,213
RESILIENT SEAT CONSTRUCTION
AND METHOD
Warren D. Brown, Bloomfield Township, Oakland County, and Samuel M. Terry, Ann Arbor, Mich.; said Terry assignor to Stubnitz Greene Corporation, a corporation of Michigan, and said Brown assignor to Chrysler Corporation, Highland Park, Mich., a corporation of Delaware
Filed Oct. 13, 1958, Ser. No. 766,769
9 Claims. (Cl. 5—354)

This invention relates to a novel seating unit cushion employing extensible spring strip elements having an elastic foam top pad connected thereto by an open mesh fabric spring reinforcing material and to the method of forming the foam pad on the seating unit structure.

In the process of producing seats having foam rubber or elastomeric foam top pads supported by a strip spring mat or basket, it is conventional to mold the foam material around the spring basket so as to embed the strip springs therein. This process, as previously employed, produces a seat construction which has the inherent drawback of not being particularly strong in the area of the embedding of the springs in the foam rubber which deficiency frequently causes tearing of the foam material in said area. This tearing eventually becomes sufficient to cause shifting of the foam cushion pad relative to the spring mat and eventually may result in a complete separation of the cushion pad from the mat.

The present invention has as its major object the formation of an especially strong bond between the foam pad and the spring mat and also an especially strong foam area in the immediate vicinity of the embedded mat.

The present invention utilizes an open mesh or "Cottnet" fabric having substantial strength as a reinforcing layer on top of the spring mat which, when embedded in the dense outer crust of a polyurethane foam rubber or the like, will impart considerable strength to the foam in the vicinity of the spring and will further provide a means for securing more firmly the foam to the springs.

A specific object of this invention is to provide a seat structure having a reinforcing mat secured to a spring basket by the dense outer crust of a polyurethane or similar type foam.

Another object is to provide a rapid method for producing fabric reinforced foam rubber or similar type pads on wire supporting structures.

Further objects and advantages will become apparent from the following description and drawings, in which:

FIGURES 3 through 6 represent successive steps in the process of manufacturing the seat of FIGURE 1 according to this invention.

Figure 1:
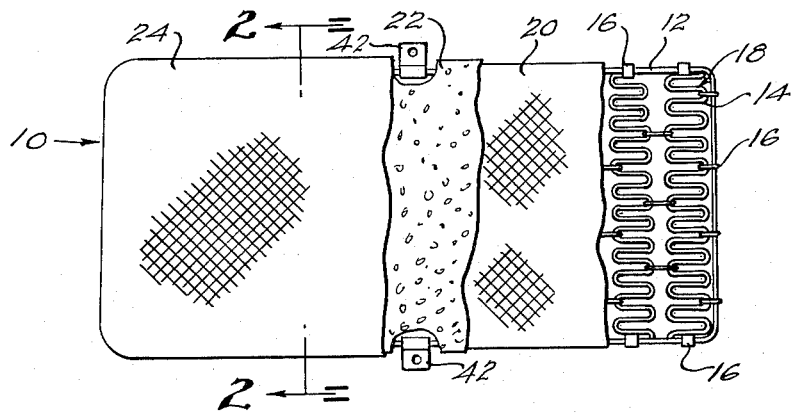
FIGURE 1 represents a multi cross sectional elevation of a seat.

Referring to the drawings and in particular to FIGURE 1, a foam padded cushion for a seat or back unit generally designated 10 is comprised of a border frame 12 and a plurality of spring strips 14 connected thereto as shown at 16. The border frame 12 and springs 14 form a spring mat or basket designated 18 which is subsequently covered by an open mesh fabric, such as burlap or Cottnet 20 having a mesh preferably of approximately ¼ inch, an elastic foam topper pad 22, preferably of polyurethane foam, and a conventional upholstery cover fabric 24.

Figure 2:
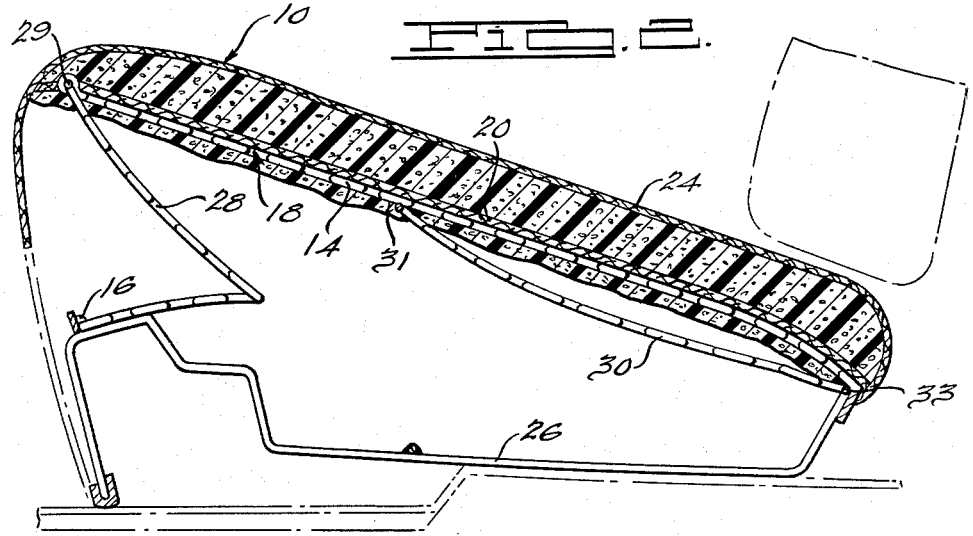
FIGURE 2 represents a cross sectional view of the seat of FIGURE 1 taken along the lines 2—2 of FIGURE 1 in the direction of the arrows.
Figure 3:
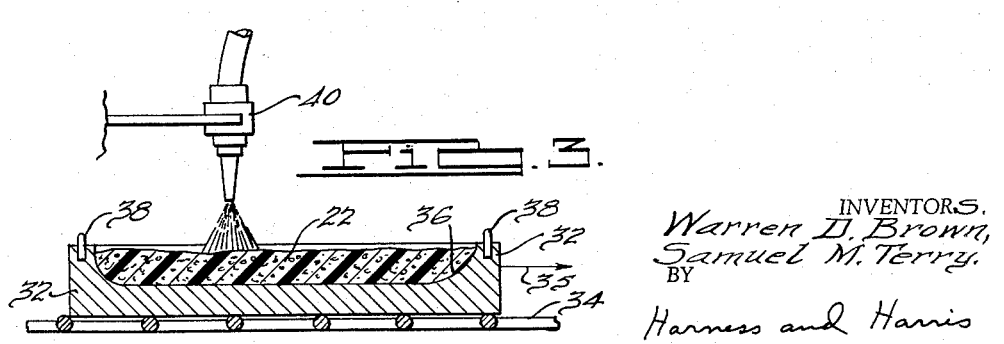

Referring to FIGURE 2, seat spring mat 18 is secured to base frame 26 by front support springs 28 attached to the front border wire 29 of the mat 18. Reinforcing springs 30 are attached to mid portions of mat 18 at 31 and to rear border wire 33. The foam pad 22 as shown in FIGURE 2 embeds the mesh fabric 20 and the spring basket 18 and is cohesively secured thereto. The fabric 20 is preferably hog ringed at spaced points to basket 18 to provide further rigidity to said basket in addition to that provided by the foam rubber embedding the same.

Referring to FIGURES 3-6, a mold 32 conveniently supported on a roller track 34 is provided with a mold cavity 36 and basket locating pins 38. A foam producing mixing nozzle 40 is movably mounted above mold 32 to spray a substantially even layer of foam 22 in cavity 36 as mold 32 moves continuously along track 34 in the direction of arrow 35.

Referring to FIGURE 4, basket 18 is provided with locating tabs 42 which, as shown in FIGURE 5, receive pins 38 to accurately locate said basket in mold cavity 36. After the molding operation, tabs 42 are bent back as shown in FIGURE 6 or alternatively they can be removed from the basket structure.

In the present process of embedding basket 18 into the foam 22, the foam raw materials comprising, for example, the reaction product of diisocyanates and hydroxyl-containing resins of polyether-glycol, and suitable catalyst (e.g. N. methylmorpholine), emulsifiers, and water are fed to nozzle 40 wherein these materials come together under a high shearing action to produce a polyurethane foam which is sprayed into cavity 36 as mold 32 moves along the track. A typical foam composition is as follows:

|  | Pts. |
| --- | --- |
| Prepolymer (8.0% free NCO) | 100 |
| DC 200 (50, Dow Corning) | 0.4 |
| N. methylmorpholine | 1.0 |
| Triethylamine | 0.2 |
| Water | 2.3 |

The prepolymer is made for foaming by adjusting the free NCO content to 8.0% (approximately 1.5 parts by weight of toluene diisocyanate per 100 parts by weight of prepolymer).

After the foam is sprayed into the mold the evolution of carbon dioxide causes the foam to rise in the cavity and at this point the basket 18 is lowered, as shown in FIGURE 5, into the cavity 36 a predetermined distance and continued rising of the foam will cause the dense upper outer crust thereof to penetrate first the mesh fabric 20 and then the spaces between the spring strips 14. At this point the foam 20 is in an adhesive state and will adhere to the springs 14 and the mesh fabric 20 and adhesively bond the fabric 20 to said springs 14. The crust portion of the foam 20 which rises to the area of the fabric 20 and springs 14 becomes quite dense due to the rapid evolution of carbon dioxide which breaks down the large cellular structure of the foam in this portion to produce an area of tough, dense foam rubber. This tough area or skin is approximately ¹⁄₁₆ of an inch thick and may form itself around the fabric 20 and springs 14 at certain portions and completely embed said fabric and springs at other portions. The elapsed time from initial contact of the two basic foam ingredients or raw materials until complete evolution of carbon dioxide gas has occurred is approximately 45 seconds and the filling of the mold with the foam and the insertion of the spring basket therein must be done rapidly. After the complete evolution of the carbon dioxide, the foam pad is precured for approximately 5-15 minutes at 250° F. The pad 22 is then stripped from the mold 32 with the spring basket 18 and fabric 20 secured thereto. The pad 22 is then processed in crushing rolls to break down a portion of the cells in the pad to decrease its rigidity. This crushing operation is followed, as shown in FIGURE 6, by a final curing operation on an overhead conveyor system 44 at approximately 250–300° F. for approximately one hour.

We claim:

1. A resilient seat unit comprising a spring unit load supporting surface, a mesh fabric layer overlying one side of said load supporting surface, and an elastomeric foam pad overlying said mesh fabric layer, a first portion of the elastomeric foam pad material extending through said mesh fabric partially embedding and adhesively bonded to said supporting surface and to said fabric layer and resiliently connecting the two, and a second portion of said foam pad material extending through said mesh fabric layer to form a topper pad on the side thereof away from said spring unit load supporting surface.

2. A resilient seat unit comprising a spring basket, a mesh fabric layer overlying the outer side of said basket, and a foam rubber pad overlying the outer side of said fabric layer, a first portion of the foam rubber pad material extending through said mesh fabric partially embedding and adhesively bonded to said basket and to said fabric layer and resiliently connecting the two, and a second portion of said foam rubber pad material extending from the inner side of said spring basket through said mesh fabric layer to form a topper pad on the side thereof away from said basket, said first portion being of denser and tougher consistency than said second portion of said foam rubber material to provide a reinforced seat structure.

3. A resilient seat unit comprising a sprink basket having a load supporting surface of longitudinally extensible resilient strips, an open mesh fabric layer overlying the outer side of said spring strip load supporting surface, and a polyurethane foam pad overlying said mesh fabric layer, a first portion of a polyurethane foam pad material extending through said mesh fabric partially embedding and adhesively bonded to said extensible strips and to said fabric layer and resiliently connecting the two, and a second portion of said foam pad material extending through said mesh fabric layer to form a topper pad on the outer side thereof, said first portion of said foam material being of denser and tougher consistency than said second portion of said foam rubber material to provide a reinforced seat pad structure with a relatively soft outer surface.

4. A resilient seat construction comprising a frame, spaced spring strips connected to said frame to form a spring basket, meshed fabric covering the top of said spring basket, and foam rubber material covering the top of said spring basket and permeating through said meshed fabric thereon and the spaces between said spring strips, said rubber material being adhesively bonded to said fabric and to said spring strips to form a foam rubber connection therebetween and extending above said spring basket to form a foam seat cushion top pad.

5. A resilient seat construction comprising a frame, spaced extensible spring strips connected to said frame to form a spring basket, open meshed fabric covering the top of said spring basket, and an elastomeric foam material covering the top of said basket and permeating through said meshed fabric thereon and the spaces between said spring strips, said foam material being a polyurethane foam adhesively bonded to said fabric and said spring strips to form an elastomeric foam connection therebetween and extending above said spring basket to form a foam seat cushion top pad.

6. A resilient seat construction comprising a frame, spaced extensible spring strips connected to said frame to form a spring basket, open meshed fabric covering the top of said spring basket, and elastomeric foam material covering the top of said basket and permeating through said meshed fabric thereon and the spaces between said spring strips, said elastomeric material being a polyurethane foam adhesively bonded to said fabric and said spring strips to form an elastomeric foam connection therebetween and extending above said spring basket to form a foam seat cushion top pad, the portion of said elastomeric foam adhesively bonded to said fabric and said spring strips being of greater density than said cushion top pad to provide reinforcement to said seat construction in the area of said spring strips and fabric.

7. A resilient seat construction comprising a frame, spaced extensible spring strips connected to said frame to form a spring basket, open meshed fabric covering the top of said spring basket, elastomeric foam material covering the top of said basket and permeating through said meshed fabric thereon and the spaces between said spring strips, said elastomeric material being a polyurethane foam adhesively bonded to said fabric and said spring strips to form a foam connection therebetween and extending above said spring basket to form a foam seat cushion top pad, the portion of said foam adhesively bonded to said fabric and said spring strips being of greater density than said cushion to provide reinforcement to said seat construction in the area of said spring strips and fabric, and fabric material covering said cushion top pad and secured to said frame to prevent said foam cushion top pad from being abraded.

8. In a method of making an integral foam cushion unit comprising a frame, a spring mat, and a topper pad, the steps of providing a female mold having the contour of the seating surface of the desired cushion unit, substantially filling said mold with an activated polyurethane foam, providing a seat frame having said spring mat connected thereto, placing and holding a mesh fabric on the exposed load supporting surface of said spring mat, inverting said spring mat and placing said spring mat load supporting surface that is covered with said fabric into said mold and causing a first portion of said foam to rise through said fabric and said spring mat load supporting surface to adhesively bond said foam to said fabric and to said spring mat with a second portion of said foam covering the outer side of said spring mat load supporting surface to form the topper pad of said unit, stripping said unit from said mold and curing said foam with heat to permanently cohesively secure said foam, said fabric, and said spring mat together.

9. In a method of making an integral foam elastomeric cushion unit comprising a frame having attached thereto a spring mat, an open mesh fabric reinforcing mat overlying and attached to said spring mat, and a topper pad, the steps of providing a mold having a surface shaped to the contour of the upper seating surface of the desired cushion unit, spraying activated elastomeric material into said mold, inverting and placing said frame with said spring mat and said reinforcing mat attached thereto into said mold a predetermined distance with said fabric reinforcing mat facing into said mold, and causing a first portion of said elastomeric material to foam and rise through said open mesh reinforcing fabric and through said spring mat to adhesively bond said elastomeric material to said fabric and to said spring mat with a second portion of said elastomeric material covering the outer side of said spring mat to form the topper pad of said cushion unit.

References Cited in the file of this patent

UNITED STATES PATENTS

| | | |
|---|---|---|
| Re. 24,529 | Mantegna | Sept. 2, 1958 |
| Re. 24,914 | Koenigsberg | Dec. 20, 1960 |
| 1,876,166 | Randall | Sept. 6, 1932 |
| 2,199,006 | Minor | Apr. 30, 1940 |
| 2,549,758 | Flint | Jan. 18, 1949 |
| 2,626,408 | Wesley | Jan. 27, 1953 |
| 2,727,278 | Thompson | Dec. 20, 1955 |
| 2,783,827 | Neely | Mar. 5, 1957 |
| 2,785,440 | Toulmin | Mar. 19, 1957 |

UNITED STATES PATENT OFFICE
CERTIFICATE OF CORRECTION

Patent No. 3,005,213 October 24, 1961

Warren D. Brown et al.

It is hereby certified that error appears in the above numbered patent requiring correction and that the said Letters Patent should read as corrected below.

Column 2, line 36, after "made" insert -- ready --; column 3, line 30, for "sprink" read -- spring --; column 4, line 11, after "basket," insert -- and --.

Signed and sealed this 10th day of April 1962.

(SEAL)
Attest:

ERNEST W. SWIDER

Attesting Officer

DAVID L. LADD

Commissioner of Patents